Oct. 29, 1957 — H. B. EHRLICH — 2,811,375
DEMOUNTABLE TANK JOINT CONSTRUCTION
Filed Aug. 14, 1956 — 2 Sheets-Sheet 1
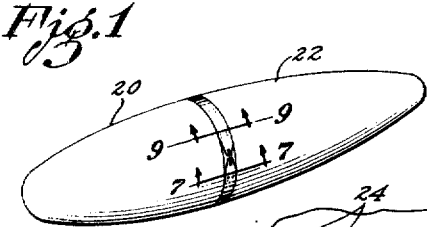
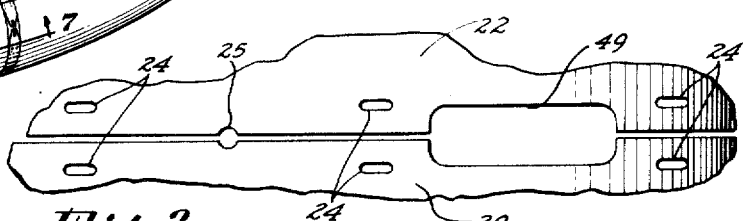
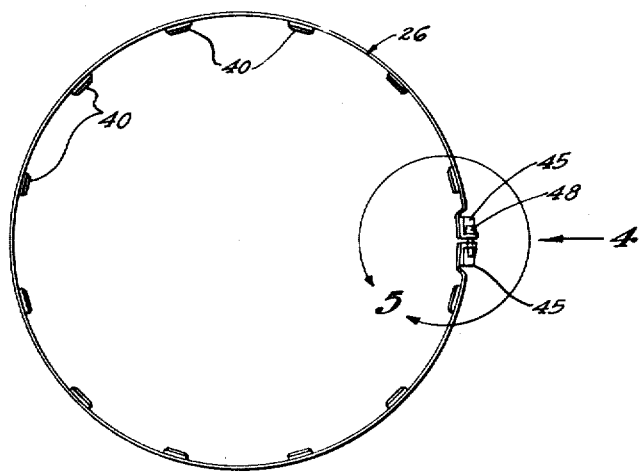
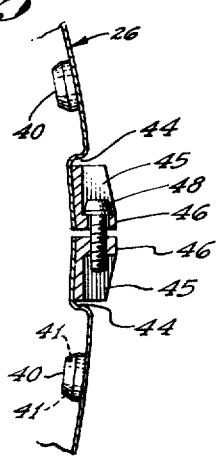
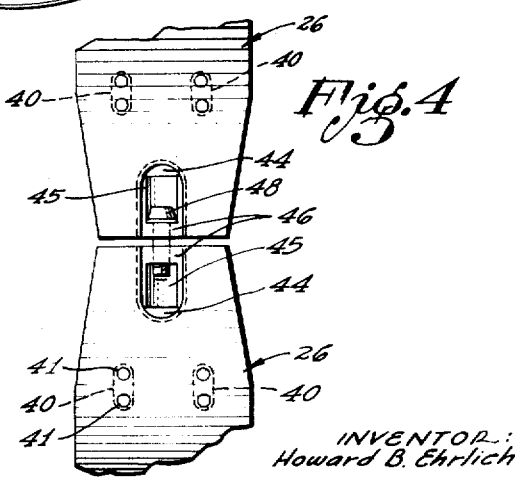
INVENTOR:
Howard B. Ehrlich
By Smyth & Roston
Attorneys

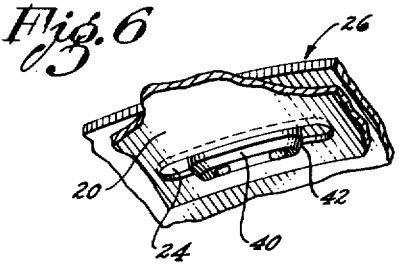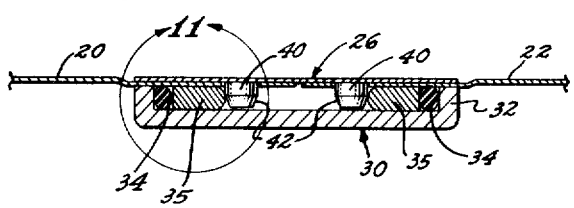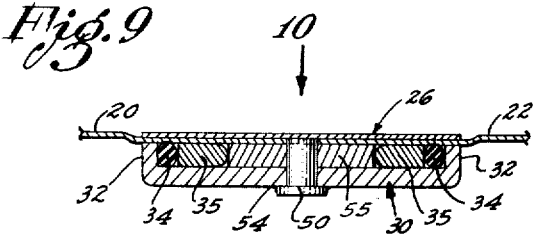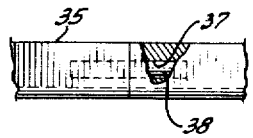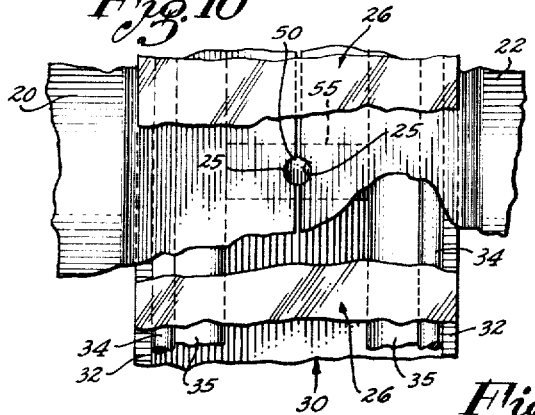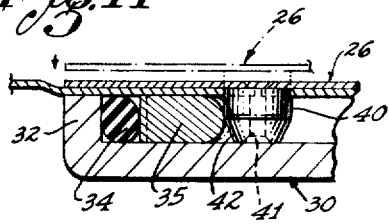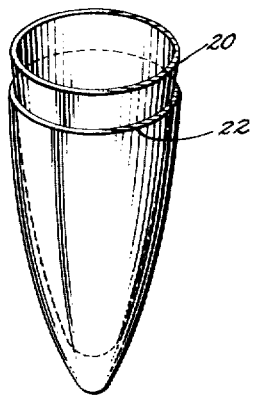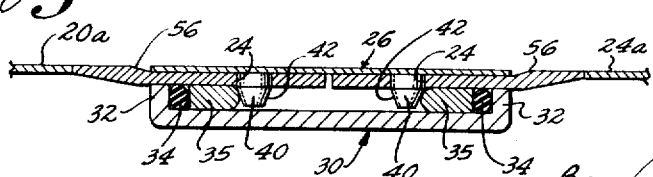
INVENTOR:
Howard B. Ehrlich
By Smyth & Roston
Attorneys

United States Patent Office

2,811,375
Patented Oct. 29, 1957

2,811,375
DEMOUNTABLE TANK JOINT CONSTRUCTION

Howard B. Ehrlich, Manhattan Beach, Calif., assignor to Pastushin Aviation Corporation, Los Angeles, Calif., a corporation Application August 14, 1956, Serial No. 603,993

13 Claims. (Cl. 285—342)

This invention relates to a joint construction for demountable hollow structures and refers particularly to junctures between body shells, such as junctures between cylindrical tank sections. While the invention is applicable to various specific purposes in various fields, it is being initially embodied in a joint structure for a demountable fuel tank for use on military aircraft. This embodiment of the invention is described herein by way of example and will provide adequate guidance for those skilled in the art who may have occasion to adapt the same principles to other specific purposes.

It is a common military practice to ship auxiliary fuel tanks in knock-down state for assembly in the field, the tank being sectionalized and the tank sections being nested together for reduction in shipping space. It is of utmost importance that the tank joint not only be structurally efficient but also be simple to assemble in the field.

It is further desirable that the tank construction permit what is termed a high nesting ratio, i. e. a high ratio between the shipping space required for a fully assembled tank and the shipping space required for the same tank when fully assembled. A maximum nesting ratio is achieved only when the dismantled parts of the tank nest snugly together. A maximum nesting ratio cannot be achieved if the sections that make a complete tank, for example, a nose section and a tail section, have extensive cylindrical portions of the same diameter; and a maximum nesting ratio cannot be achieved if the open ends of the nested sections carry any joint structure whatsoever that extends either radially inward or radially outward from the section shells.

A feature of the particular tank of the present embodiment of the invention is that only narrow end portions of the tail and nose sections are cylinders of the same diameter. A further feature of the invention is that the open ends of the two sections carry no joint structure whatsoever to interfere with nesting. In a typical practice of the invention, the two nose and tail sections comprising a complete tank nest in snug contact with each other and only a fraction of the open end of one section extends beyond the open end of the other section.

In accord with the teaching of the invention, the adjacent ends of the two tank shells are of the same diameter and have circumferentially spaced apertures near their ends or rims. The two abutting tank shells are mechanically interlocked by an encircling strap having inner lugs or projections that engage the rim apertures of the two shells. The mechanical joint effected by the lug-equipped strap is sealed by an inner joint ring assembly. The inner joint ring assembly includes a continuous ring that is preferably channel-shaped in cross-sectional configuration with the side flanges of the channel extending radially outward to serve as circumferential ribs in contact with the inner surfaces of the two abutting tank shells. A pair of resilient rubber-like sealing rings inside the channel ring seal the junctures between the circumferential channel ribs and the inner surfaces of the two shells.

A feature of the invention is that the lugs of the outer strap that engages the tank apertures to interconnect the two tank sections also function in the channel ring to provide a wedging or camming action to place the pair of rubber-like rings under sealing pressure. In the preferred practice of the invention, a pair of what may be termed pressure rings made of relatively rigid material is mounted inside the channel ring to apply the required sealing pressure to the rubber-like resilient rings and the lugs of the outer strap are tapered for camming action to wedge or spread the pressure rings apart against the resilient sealing rings.

To assemble such a tank in the field, the inner channel ring with the associated pair of rubber-like sealing rings and the associated pair of pressure rings is telescoped into the adjacent ends of the two tank shells and these adjacent ends are brought together. The outer joint strap is then wrapped around the adjacent ends of the two tank sections and is tightened to complete the joint.

The tightening of the strap with the lugs thereon extending through the tank shell apertures results in the required camming of the pressure rings to seal the joint. This whole assembly procedure requires no specialized skill whatsoever and requires no special tools. In the preferred practice of the invention, the joint strap is tightened by a simple screw means that may be readily manipulated by commonly available wrenches or the like.

The various features and advantages of the invention will be apparent from the following detailed description considered with the accompanying drawings.

In the drawings, which are to be regarded as merely illustrative:

Figure 1 is a perspective view on a reduced scale of a completely assembled aircraft fuel tank constructed in accord with the presently preferred practice of the invention;

Figure 2 is a fragmentary plan view of the adjacent edge portions of the two tank shells showing apertures and recesses provided therein for the purpose of the joint;

Figure 3 is a side elevation of the joint strap;

Figure 4 is a fragmentary front elevation on an enlarged scale of the inner connecting ends of the strap, the view being taken as indicated by the arrow 4 in Figure 3;

Figure 5 is an enlargement of a portion of Figure 3 as indicated by the circle 5 in Figure 3;

Figure 6 is a fragmentary perspective view as seen from the inside showing how a lug of the strap engages a rim aperture of a tank shell;

Figure 7 is an enlarged cross section of the tank joint taken as indicated by the line 7—7 of Figure 1 and showing how a pair of lugs on the strap engage the pair of pressure rings;

Figure 8 is a fragmentary side elevation of a pressure ring showing how the two adjacent ends of the ring may be interconnected by a dowel pin;

Figure 9 is a cross section of the joint structure showing how the inner channel ring is provided with a centering pin and a spacer block;

Figure 10 is a fragmentary plan view of the joint structure with parts broken away, the view being taken as indicated by the arrow 10 in Figure 9;

Figure 11 is an enlarged portion of Figure 7 taken as indicated by the circle 11;

Figure 12 is a perspective view of the two sections of a tank nested together for shipment; and Figure 13 is a sectional view similar to Figure 7 showing a modified form of the joint structure.

In the drawings, which illustrate the presently preferred practice of the invention, Figure 1 shows a completely assembled auxiliary fuel tank for an aircraft, the tank being made in two sections comprising thin walled shells 20 and 22. As indicated in Figure 2 the rim portion of each of the two shells or tank sections 20 and 22 is provided with circumferentially spaced apertures 24. Preferably, but not necessarily, the apertures 24 are elongated to take the form of circumferentially oriented slots. Also, preferably but not necessarily, the rim apertures or slots 24 are so located that the slots in the two shells are paired with each other in the completely assembled tank.

It is further contemplated that the rim of each of the two tank shells 20 and 22 will be provided with at least one centering recess 25, three centering recesses in each shell being preferred with the recesses matching when the shells are assembled. If desired, the centering recesses 25 may be positioned at unequal circumferential spacing so that the centering recesses will match at only one rotational orientation of the two shells relative to each other. Such unequal spacing is desirable, for example, when the two tank sections have openings or fittings that must have particular positions relative to each other.

The joint structure for interconnecting the two tank shells 20 and 22 in the completely assembled tank comprises an outer joint strap 26 and a cooperating inner channel ring assembly. As shown in Figure 7, the inner channel ring assembly includes: a continuous channel member 30 having side flanges 32 which may be regarded as ribs; a pair of continuous sealing rings 34 of rubberlike material inside the channel, and a pair of pressure elements or rings 35 inside the channel, which pressure rings are adapted to place the sealing rings 34 under sealing pressure.

The channel member 30 may be an extruded form welded to form a continuous ring and the two rubber-like sealing rings 34 may also be continuous rings since they may be stretched to pass over a flange of the channel ring. The two pressure rings 35, however, are split rings to permit them to be introduced into the channel ring. As shown in Figure 8, the two ends of each of the pressure rings 35 may be provided with matching bores 37 to receive a dowel pin 38 for holding the two ends in alignment.

The joint strap 26 overlaps the matching edges of the assembled tank shells 20 and 22, and as shown in Figures 7 and 9, the marginal portions of the two tank shells may be offset inwardly to form a shallow circumferential groove to seat the strap so that the assembled strap may have substantially the same outside diameter as the adjacent portions of the two tank shells. The joint strap 26 has two circumferential rows of spaced elongated inner lug elements 40 which may be secured thereto by rivets 41 as shown in Figures 4 and 5. These lugs 40 correspond to and engage the rim slots 24 of the two tank shells and since the rim slots of the two tank shells are paired, the strap lugs are also paired. Each of the strap lugs 40 is formed with a bevel 42 so that the beveled sides of the lugs may act upon the pressure rings 35 with a cam action as shown in Figure 11 for displacing the pressure rings into pressure contact with the corresponding sealing rings 34. The bevels 42 may be cut at 20° relative to the sides of the lugs. To facilitate this cam action, the pressure rings 35 may be formed with rounded inner edges as shown.

Since the joint strap 26 is assembled with a circumferential wrapping action and since the lugs 40 move slightly circumferentially when the strap is tightened, the rim slots 24 of the two tank shells 20 and 22 must be somewhat longer than the strap lugs. Preferably, the bevel 42 of each of the elongated lugs 40 is extended around the two ends of the lugs as shown in Figure 6 to reduce the extent to which the slots 24 must be elongated relative to the lugs to permit entrance of the lugs in the course of the wrapping of the strap 26 around the tank.

When the strap lugs 36 are inserted through the rim slots 24 of the two shell sections and the strap is then tightened, the lugs act on the pressure rings 35 with a wedging action or camming action to spread the two pressure rings 35 apart as indicated in Figure 11, thereby to force the two pressure rings 35 against the corresponding sealing rings 34 to place the sealing rings under pressure. Preferably the two ends of the strap 26 are interconnected by screw means to provide an effective tightening action. Thus, as best shown in Figures 4 and 5, the two ends of the strap 26 may be offset to form a pair of matching recesses 44 to seat corresponding end fittings 45, the end fittings being welded or otherwise bonded to the strap. The two end fittings have radial flanges 46 through which a suitable screw 48 is threaded for the purpose of pulling the two strap ends together. To provide clearance for the offsets that form the strap recess 44, the two tank shells 20 and 22 are provided with matching elongated edge recesses 49, as shown in Figure 2.

As shown in Figures 9 and 10 the channel ring 30 may be provided with a plurality of centering lugs or pins 50 for engagement with the pairs of rim recesses 25. In this instance, the centering lugs or pins 50 are in the form of flat-headed rivets 52 that extends through the web of the channel ring 30 and are bonded thereto by welding 54 in a fluid-tight manner. Preferably, the channel ring assembly includes at least two spacer blocks 55 to hold the two pressure rings 35 apart at sufficient spacing from each other for ready camming engagement by the strap lugs 40. As indicated in Figure 9, the spacer blocks 55 may be positioned in the regions of the centering pins 50 with the centering pins extending through the spacer blocks. The spacer blocks 55 may be held in position in any suitable manner, for example, by bonding the spacer blocks to the centering pins or by bonding the spacer blocks to the channel ring 30.

The manner in which the invention functions for its purpose may be readily understood from the foregoing description. The tanks are shipped to destinations in dismantled state. The two tank sections 20 and 22 may be nested together for this purpose as shown in Figure 12 and, if desired, more than two of the conical tank sections may be telescoped together. In this instance, the two tank sections are tapered throughout the major portions of their length with only relatively narrow rim portions of the same diameter. Thus a pair of tank sections or shells may be telescoped together as shown in Figure 12 with only four inches of the inner section extending beyond the rim of the outer section. Such an arrangement results in an exceptionally high nesting ratio. The remaining components of the tank including the strap 26 and the components of the inner ring assembly may be packed separately in a highly compact manner.

The first step in the field assembly of a tank is to telescope the channel ring assembly into the rim of one of the two tank shells 20 and 22 with the centering pin 50 of the channel ring assembly seated in the corresponding rim recesses 25. The second step is to telescope the second tank section over the telescoped channel ring assembly to bring the two edges of the tank sections together with the rim recesses 25 of the second tank section also engaging the centering pins 50.

With the two tank sections or shells 20 and 22 mated in this manner, the next step is to wrap the strap 26 around the joint to cause the pairs of strap lugs 40 to enter the corresponding pairs of rim slots 24 in sequence. The screw 48 is then tightened to reduce the diameter of the strap and thereby cause the strap lugs 40 to be moved inward against the rounded edges of the pressure rings 35. The consequent camming action of the strap lugs 40 against the pressure rings 35 forces the pressure rings into pressure contact with the sealing rings 34. When the screw 48 is sufficiently tightened to restrict the band 26 into snug contact with the matching edges of the two tank shells 20 and 22, the pressure rings 35 apply sufficient pressure to the sealing rings 34 to distort the sealing rings as shown in Figure 11 thereby causing the sealing rings to make sealing contact both with the channel rings 30 and with the inner surfaces of the corresponding tank shells, the sealing contact in both instances being continuous around the circumference of the tank.

It is apparent that the strap lugs 40 have a dual function. One of the functions of the lugs is to serve as keys for cooperating with the rim slots 24 for mechanically interlocking the two tank sections. The other function of the strap lugs 36 is to create the described sealing pressure by cam action against the pressure rings 35. It is further apparent that any number of tank sections may be interconnected in a fluid-tight and structurally efficient manner by means of the described joint structure.

The modified form of the invention illustrated by Figure 13 is, for the most part, identical with the structure heretofore described, as indicated by the use of corresponding numerals to indicate corresponding parts. In this modification, special extruded bands or rings 56 of thicker material than the two tank shells 20a and 22a are welded to the two tank shells to serve as rim members therefor. These rim members 56 are provided with rim slots 24 to receive the inner lugs 40 of the strap 26 in the manner heretofore described. The advantage of this embodiment of the invention is that it provides a relatively strong joint structure for thin-walled tank shells.

My description in detail of the presently preferred practices of the invention will suggest various changes, substitutions and other departures from my disclosure within the spirit and scope of the appended claims.

I claim:

1. In a demountable sectionalized hollow structure, the combination of: two shells for assembly end-to-end, said shells having circumferentially spaced apertures near their adjacent ends; a continuous inner joint ring dimensioned to telescope into said adjacent ends of the two shells, said inner joint ring having two spaced radially outward ribs positioned to line on opposite sides of said apertures of the two shell ends; an outer strap to encircle said adjacent ends of the two shells; a set of lugs on the inner side of said strap to move into and through said apertures of both of the shells to interlock the two tank shells when the strap is wrapped and tightened around said adjacent ends; and sealing means between said ribs to exert sealing pressure against the ribs and against the adjacent inner surfaces of said two shells in response to movement of said lugs through said apertures when said strap is tightened.

2. A combination as set forth in claim 1 which includes means carried by said inner joint ring for engagement with at least one of said shells to limit movement of the joint ring axially inward of the shell.

3. A combination as set forth in claim 2 in which said limiting means comprises at least one radial centering projection and said adjacent ends of the two shells have matching recesses for engagement by said projection.

4. A combination as set forth in claim 1 in which tightening means adjustably interconnects the ends of said strap and is offset radially inwardly from the line of curvature of the strap; and in which the edges of said adjacent shell ends have matching recesses to clear the tightening means.

5. A combination as set forth in claim 1 in which the adjacent ends of the two shells are offset radially inwardly by substantially the thickness of the strap thereby forming a circumferential groove to seat the strap.

6. In a demountable sectionalized hollow structure, the combination of: two shells for assembly end-to-end, said shells having circumferentially spaced apertures near their adjacent ends; an inner joint ring dimensioned to telescope into said adjacent ends of the two shells, said joint ring having two spaced circumferential radial ribs positioned to lie on opposite sides of said apertures of the two shell ends; a strap to encircle said adjacent two ends of the shells; means to tighten said strap; a set of elements mounted on the inner side of said strap to move into and through said apertures of the two shells to interconnect the shells when the strap is wrapped around the adjacent ends of the shells; two spaced resilient circumferential sealing rings carried by said joint ring adjacent said ribs respectively; and a set of two circumferential pressure elements between said two sealing rings, the elements of one of said sets having cam surfaces for contact with the elements of the other set to cause said pressure elements to be spread apart against said sealing rings in response to movement of said elements on the straps through said apertures when the strap is tightened, thereby to place said sealing rings under pressure against said joint ring and against the inner surfaces of the two shells.

7. A combination as set forth in claim 6 in which said elements on the straps have cam surfaces.

8. A combination as set forth in claim 7 in which said pressure elements have rounded surfaces for sliding contact with said cam surfaces.

9. A combination as set forth in claim 6 which includes spacer means between said two pressure elements to maintain the pressure elements in positions for camming engagement by said elements on the strap.

10. A combination as set forth in claim 9 which includes centering means extending outward from said inner joint ring for engagement with at least one of said shells to limit movement of the joint ring axially inwardly of the shell.

11. In a demountable sectionalized hollow structure, the combination of: two shells positioned end-to-end, each having a series of circumferentially spaced apertures near its end; an inner joint ring telescoped into the adjacent ends of the two shells, the joint ring being channel-shaped in cross section with a pair of radial side flanges extending on opposite sides of said two series of apertures; a pair of inner circumferential sealing rings seated in said joint ring against said side flanges respectively in contact with the inner circumferential surfaces of the two shells, respectively, on opposite sides of the two series of apertures; a pair of pressure rings seated in said joint ring in contact with said circumferential sealing rings respectively; and a strap encircling said adjacent ends of the two shells, said strap having inward projections extending through said pairs of apertures respectively between said pressure members and wedging the pressure members apart against said sealing rings to place the sealing rings under sealing pressure against the joint ring and against the inner surfaces of the two tank shells.

12. A combination as set forth in claim 11 in which said apertures are slots oriented circumferentially of the two shells and said projections are elongated for engagement with the slots.

13. A combination as set forth in claim 12 in which said projections are tapered for camming action against said pressure ring.

References Cited in the file of this patent

UNITED STATES PATENTS

| | | |
|---|---|---|
| 442,837 | Ward | Dec. 16, 1890 |
| 936,627 | Hill | Oct. 12, 1909 |
| 2,120,184 | Mojonnier | June 7, 1938 |
| 2,751,109 | Moore | June 19, 1956 |

FOREIGN PATENTS

| | | |
|---|---|---|
| 302,653 | Switzerland | Jan. 3, 1955 |

UNITED STATES PATENT OFFICE
CERTIFICATE OF CORRECTION

Patent No. 2,811,375                    October 29, 1957

Howard B. Ehrlich

It is hereby certified that error appears in the printed specification of the above numbered patent requiring correction and that the said Letters Patent should read as corrected below.

Column 5, line 39, for "line on" read --lie on--.

Signed and sealed this 21st day of January 1958.

(SEAL)
Attest:

KARL H. AXLINE
Attesting Officer

ROBERT C. WATSON
Commissioner of Patents